(12) United States Patent
Rost et al.

(10) Patent No.: US 10,531,476 B2
(45) Date of Patent: Jan. 7, 2020

(54) SCHEDULER-MANAGED ROUTING OF INFORMATION IN CLOUD-RAN DATA CENTERS

(71) Applicant: NEC Europe Ltd., Heidelberg (DE)

(72) Inventors: Peter Rost, Heidelberg (DE); Simon Oechsner, The Hague (NL)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/562,900

(22) PCT Filed: Feb. 4, 2016

(86) PCT No.: PCT/EP2016/052415
§ 371 (c)(1),
(2) Date: Sep. 29, 2017

(87) PCT Pub. No.: WO2016/155918
PCT Pub. Date: Oct. 6, 2016

(65) Prior Publication Data
US 2018/0084567 A1   Mar. 22, 2018

(30) Foreign Application Priority Data

Mar. 31, 2015   (EP) .................................... 15162075

(51) Int. Cl.
*H04W 72/12*   (2009.01)
*H04W 88/08*   (2009.01)
(Continued)

(52) U.S. Cl.
CPC ..... *H04W 72/1205* (2013.01); *H04L 41/0896* (2013.01); *H04L 41/12* (2013.01);
(Continued)

(58) Field of Classification Search
CPC . H04W 72/1205; H04W 28/12; H04W 72/12; H04W 88/085; H04W 88/08;
(Continued)

(56) References Cited

U.S. PATENT DOCUMENTS 9,554,296 B2 *   1/2017   Rao .......................... H04W 4/70
9,729,396 B2 *   8/2017   Rosa de Sousa Teixeira ..............
H04L 41/5025

(Continued)

FOREIGN PATENT DOCUMENTS

EP       2849524 A1   3/2015

OTHER PUBLICATIONS

Radhika Niranjan Mysore et al.: "Portland: A scalable fault-tolerant layer 2 data center network fabric", Sigcomm Comput. Commun. Rev., [Online] vol. 39, No. 4, Aug. 2009 (Aug. 2009), pp. 39-50, XP002757754.

*Primary Examiner* — Brian T O'Connor
(74) *Attorney, Agent, or Firm* — Leydig, Voit & Mayer, Ltd.

(57) ABSTRACT

A method of managing Radio Access Network (RAN) processing within a data center of a centralized radio access network (CRAN), wherein the data center comprises a plurality of compute resources that perform at least part of the RAN processing of a plurality of connected remote radio access points, includes assigning, to packets from the plurality of remote radio access points, an identification information that originates from the RAN; deciding, by schedulers based on a scheduling algorithm, on which of the compute resources processing of the packets is to take place; and using the identification information to route the packets within the data center. The compute resources are implicitly addressed through the identification information.

17 Claims, 3 Drawing Sheets

(51) Int. Cl.
*H04L 12/715* (2013.01)
*H04W 28/12* (2009.01)
*H04L 12/24* (2006.01)
*H04W 72/04* (2009.01)
*H04W 72/08* (2009.01)
*H04W 16/32* (2009.01)
*H04W 16/28* (2009.01)
*H04L 1/18* (2006.01)
*H04L 29/08* (2006.01)

(52) U.S. Cl.
CPC .......... *H04L 41/5096* (2013.01); *H04L 45/64* (2013.01); *H04W 28/12* (2013.01); *H04W 72/12* (2013.01); *H04W 88/085* (2013.01); *H04L 1/1812* (2013.01); *H04L 67/32* (2013.01); *H04W 16/28* (2013.01); *H04W 16/32* (2013.01); *H04W 72/04* (2013.01); *H04W 72/046* (2013.01); *H04W 72/082* (2013.01); *H04W 88/08* (2013.01)

(58) Field of Classification Search
CPC . H04W 16/32; H04W 72/046; H04W 72/082; H04W 72/04; H04W 16/28; H04W 48/16; H04W 8/26; H04W 84/12; H04W 40/02; H04L 45/64; H04L 1/1812; H04L 67/32; H04L 61/6086; H04L 61/2015; H04L 45/38; H04L 41/0803; H04L 41/0896; H04L 12/4633; H04L 4145/64; H04L 41/5096; H04L 41/12
See application file for complete search history.

(56) References Cited

U.S. PATENT DOCUMENTS

| | | | | |
|---|---|---|---|---|
| 10,120,722 | B2* | 11/2018 | Hamway | H04L 41/0806 |
| 10,193,798 | B2* | 1/2019 | Roeland | H04L 12/4633 |
| 10,244,387 | B2* | 3/2019 | Cui | H04W 24/02 |
| 2015/0296445 | A1* | 10/2015 | Zhou | H04W 48/16 |
| | | | | 370/328 |
| 2017/0251385 | A1* | 8/2017 | Fox | H04L 41/5025 |
| 2018/0262424 | A1* | 9/2018 | Roeland | H04L 12/4633 |

* cited by examiner

SCHEDULER-MANAGED ROUTING OF INFORMATION IN CLOUD-RAN DATA CENTERS

CROSS REFERENCE TO RELATED APPLICATIONS

This application is a U.S. National Stage Application under 35 U.S.C. § 371 of International Application No. PCT/EP2016/052415 filed on Feb. 4, 2016, and claims benefit to European Patent Application No. EP 15162075.4 filed on Mar. 31, 2015. The International Application was published in English on Oct. 6, 2016 as WO 2016/155918 A1 under PCT Article 21(2).

FIELD

The present invention generally relates to a method of managing RAN, Radio Access Network, processing within a data center of a centralized radio access network, CRAN, wherein said data center comprises a number of compute resources that perform at least part of the RAN processing of a number of connected remote radio access points. Furthermore, the present invention relates to a centralized radio access network, CRAN, comprising a number of remote radio access points, and a data center including a number of physical compute hosts configured to perform at least part of the RAN, Radio Access Network, processing of said remote radio access points.

BACKGROUND

Future radio access networks (RANs) are going to be more centralized than today's RANs, at least partly, i.e. radio access points only perform part of the RAN protocol stack while the main part is performed centrally (see FIG. 1). This implies that a remote radio access point only performs part of Layer 1-3 of the RAN functionality while the remaining functionality is performed at a central processor. This central processor may be a virtual BS pool executed on top of a cloud-computing platform, as described, e.g., in "C-RAN The Road Towards Green RAN", White Paper v2.5, October 2011, CMCC, or in P. Rost, C. J. Bernardos, A. De Domenico, M. Di Girolamo, M. Lalam, A. Maeder, D. Sabella, and D. Wübben, "Cloud technologies for flexible 5G radio access networks", IEEE Communications Magazine, vol. 52, no. 5, May 2014.

The considered data rates in a centralized RAN (CRAN) environment may vary significantly depending on the underlying functional split and parameterization. For 100 base stations, the expected traffic may range from a few 100 Gbps in the case of a very low-layer centralization, to a few 10 Gbps for user-based centralization, and a few Gbps for Layer-2 centralization. Latency requirements will range from a few 100 microseconds in the case of lower-layer splits to a few milliseconds in the case of user-based centralization and Layer-2 centralization.

SUMMARY

In an embodiment, the present invention provides a method of managing Radio Access Network (RAN) processing within a data center of a centralized radio access network (CRAN), wherein the data center comprises a plurality of compute resources that perform at least part of the RAN processing of a plurality of connected remote radio access points. The method includes assigning, to packets from the plurality of remote radio access points, an identification information that originates from the RAN; deciding, by schedulers based on a scheduling algorithm, on which of the compute resources processing of the packets is to take place; and using the identification information to route the packets within the data center. The compute resources are implicitly addressed through the identification information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
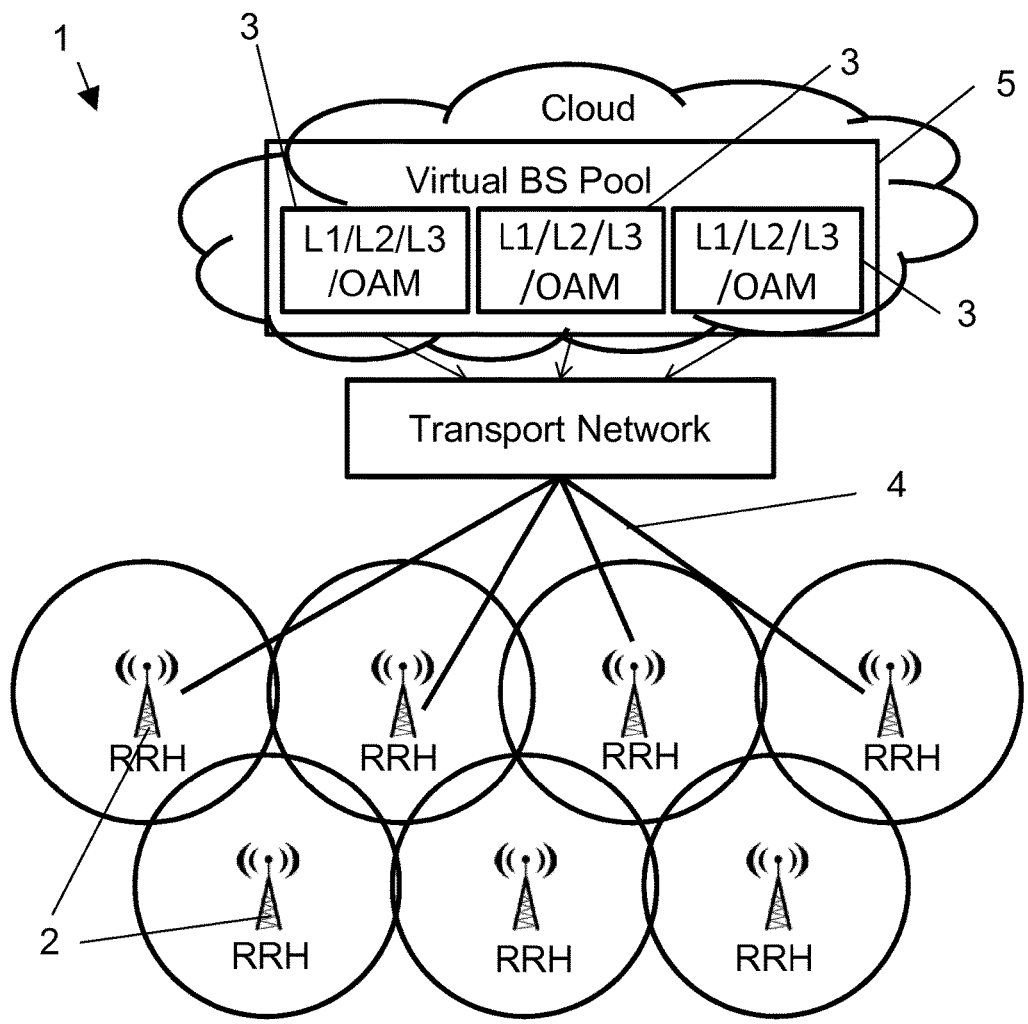
FIG. 1 is a schematic view illustrating the basic principle of a Cloud-RAN architecture.

A major challenge that needs to be solved is the distribution of RAN processing within a data center. In this context it is important to note that each user may be processed independently by a RAN-App, which performs all centralized RAN functionality for an individual user terminal.

Embodiments of the present invention provide methods of managing RAN processing within a data center of a CRAN and a CRAN in such a way that economy-of-scale effects of executing individual RAN processing of each base station (and their assigned user terminals) within the data center can be exploited. Embodiments of the invention further improve the efficiency of compute resource utilization within the data center.

According to an embodiment, a method is characterized in that packets from said remote radio access points are assigned an identification information that originates from the RAN, wherein schedulers that decide, based on a scheduling algorithm, on which of said compute resources the processing of said packets is to take place, use said identification information to route said packets within said data center, wherein said compute resources are implicitly addressed through said identification information.

Furthermore, embodiments of the invention provide centralized radio access networks, which comprise a routing mechanism that assigns packets from said remote radio access points an identification information that originates from the RAN, and a scheduling system including a number of schedulers, wherein said schedulers are configured to decide, based on a scheduling algorithm, on which of said compute resources the processing of said packets is to take place, and to use said identification information to route said packets within said data center, wherein said compute resources are implicitly addressed through said identification information.

According to embodiments of the invention it has first been recognized optimizations for RAN processing can be achieved by properly designing the data center infrastructure. This infrastructure includes the connections of the base stations to the data center(s) as well as the topology of the data center itself. According to embodiments of the present invention, the infrastructure design can minimize delay from reception of the data at the base-station until the data has been processed. In this regard it has been recognized that RAN processing may benefit from cooperation among user terminals, hence, it may be beneficial if data of user terminals is exchanged to facilitate the processing.

According to the present invention RAN identification information is utilized to schedule processing jobs within a data center that processes the connected base stations. That is, information originating from RAN is used to perform routing within data centers, wherein the processing servers of the data center are not addressed, but only RAN information which is then routed, e.g. through SDN, to available servers selected by applying a scheduling algorithm. Embodiments comprise the steps of using RAN identifiers for addressing and routing of information based on RAN identifiers within the data center. By applying the present invention, implicit load balancing and overhead reduction for information processing and routing within data centers can be achieved. Embodiments of the invention contribute to achieving scalability of Cloud-RAN, and it provides decentralized control for higher resiliency.

According to an embodiment of the invention the identification information may be used as a locator. In other words, the identification information (that indicates the origin of the respective packets within the RAN) may be utilized to serve as a representation of the destination of the packet within the data center.

According to an embodiment of the invention the identification information may be constructed or designed to contain a RAN-ID which is unique for each user and base station ID combination within the RAN. In this regard it may be provided, for instance, that the RAN-ID is composed of a cell ID (e.g. ECI, E-UTRAN Cell Identifier) and a user ID within the cell (e.g. C-RNTI, Cell Radio Network Temporary Identity).

According to an embodiment the RAN-ID may be encoded within the packets as destination address. Thus, by taking switching decisions on the basis of such RAN-ID, the need of utilizing IP addresses can be obviated. In this regard it should be noted that this RAN-ID may also be used within the transport network connecting the RAN with the data center.

According to an embodiment the scheduling system within the data center may be organized hierarchically, such that scheduling and routing may be performed hierarchically. For instance, it may be provided that the scheduling system includes a data center level, a pod level and a rack level, with at least one scheduler being deployed per level, i.e. the scheduling system comprises at least one scheduler operating on a data center level, a scheduler operating on a pod level, and a scheduler operating on a rack level.

According to an embodiment scheduling and routing of RAN processing tasks is performed jointly. To do so, it proves to be advantageous having the hierarchical scheduling system tightly integrated with the switching fabric of the network topology. Based on this structure, basically, a scheduling-defined routing can be performed.

According to an embodiment a RAN processing task, hereinafter sometimes also termed RAN-App, may cover processing of individual user terminals (user specific RAN-App) or all user terminals that are attached to a particular of said radio access points (base station specific RAN-App).

According to an embodiment the scheduling algorithm may be configured to aim at co-locating related RAN processing tasks within the data center. For instance, related RAN processing tasks may include processing tasks of different user terminals that are attached to the same base station, that are in close physical proximity to each other and/or that are possibly interfering with each other. By co-locating such tasks within the data center, the processing delay between these tasks can be significantly reduced. Furthermore, economy-of-scale effects can be exploited by executing the individual RAN-App of each base station (and their assigned user terminals) within datacenters in a co-located fashion, e.g. on the same or at least on neighbored compute resources.

For instance, assuming a user terminal A is already scheduled for processing on a given compute resource of the data center, and a second user terminal B is to be scheduled that could lead to a processing gain if processed jointly with user terminal A (e.g., due to being attached to the same base station and being located in close proximity to each other). Then, if compute resources are free in close topological proximity to the compute resource assigned to the RAN processing of user terminal A (in particular on the same node or physical compute host, or at least within the same rack), the scheduling algorithm would schedule user terminal B to be processed there. If not, either the performance gain is forsaken, or the scheduling algorithm may re-schedule user terminal A to be processed together with user terminal B in an area of the data center where enough resources are available for both processes (e.g. on hosts within a different rack).

According to an embodiment the RAN and the data center may be connected via an SDN network (which may be controlled and managed by the network operator). In this case, which may include the provision of, e.g., OpenFlow switches along the packet path, the switches may forward the packets simply according to their installed rules and the destination (L2) address of the packet. Alternatively, if the RAN and the data center are not connected via an SDN network, the traffic described above can be encapsulated and tunneled to a tunnel endpoint located within or at least close to the data center from where onwards the above mentioned scheduling and routing/switching conditions apply.

There are several ways how to design and further develop the teaching of the present invention in an advantageous way. To this end it is to be referred to the dependent patent claims on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will be explained. In the drawing FIG. 1 is a schematic view illustrating a possible option of a centralized CRAN architecture, in which embodiments of the present invention can be suitably applied. As shown in FIG. 1, in the CRAN architecture, generally denoted by reference numeral 1, a functional split of the base station functionality is realized between distributed access points and a centralized access controller. More specifically, the access points (according to conventional prior art terminology that to some extent depends on the degree of centralization, also denoted as radio function units, remote radio heads, RRH, or remote radio access points, RAP, 2) are separated from the base station's access controller 3, also referred to as digital function unit or baseband unit (BBU), with a backhaul link 4 between RAPs 2 and access controller 3. The advent of centralized-RAN technology enables the potential to have centralized processing of data.

According to the aforesaid, in a centralized radio access network (CRAN), base station processing is centralized at a (cloud) processing or data center 5. This (centralized) data center 5 performs part or all of the processing which is traditionally performed at the (remote) base stations, e.g. analog-to-digital conversion and digital base band processing (for reference see, e.g., C. Chen and J. Huang, "Suggestions on potential solutions to C-RAN by NGMN alliance," NGMN Alliance, Tech. Rep., January 2013).

Embodiments of the present invention, as described hereinafter in detail, deal with the general problem of how to distribute RAN processing within data center 5 or, to put it more precisely, among the compute resources of data center 5, aiming at minimizing the delay from reception of data at the base station until the data has been processed, particularly the delay between related 'RAN-Apps'. Hereinafter, the term RAN-App will be used to refer to software RAN processing tasks that either belong to an individual user terminal or to an individual base station (or remote radio access point). In other words, each RAN-App may either operate based on user terminals or based on base-stations. Hence, a RAN-App may process all user terminals that are attached to the base station. Alternatively, a RAN-App may only process an individual user terminal such that each user terminal of a base station may be processed by different RAN-Apps.

As will be described in more detail below in connection with FIG. 3, embodiments of the present invention use a hierarchical scheduling system that is tightly integrated with the switching fabric of the network topology and that enables scheduling-defined routing. In particular, packets from base stations are switched based on identification information that originates from the RAN. For instance, this identification information can be a RAN-ID which is unique for each user and base station ID combination within the RAN. The switching path is determined by schedulers deciding where the processing of these packets is to take place.

To this end, the packets from the base stations containing the information to be processed do not need to use the full network stack. The functionality of a transport protocol is either not necessary since the network is not to be shared with other non-RAN applications or to be implemented in the RAN-App. In this context, the following issues should be noted:

First of all, a reliable transport protocol is not helpful, since retransmissions of lost data would violate the strict timing constraints of the applications. Packets contain sequence numbers so that re-ordering (which is improbable) and packet losses can be detected by the application.

Secondly, flow and congestion control are unnecessary due to the nature and predictability of the traffic.

Thirdly, connection establishment and state incurs extra overhead and delay without any gain, while making migrations of RAN-Apps more complex.

Fourthly, since switching decisions are to happen based on RAN-IDs, this RAN-ID can be utilized as a locator (i.e. as a locator of the destination of the respective packets), obviating the need for utilizing IP addresses.

Fifthly, RAN-Apps on the hosts, i.e. the compute resources, are able to discern packet flows based on their content (for which they need to circumvent the normal protocol stack). This is feasible since the RAN-ID can be contained in the packet payload, as will be described hereinafter in connection with FIG. 2.

Figure 2:
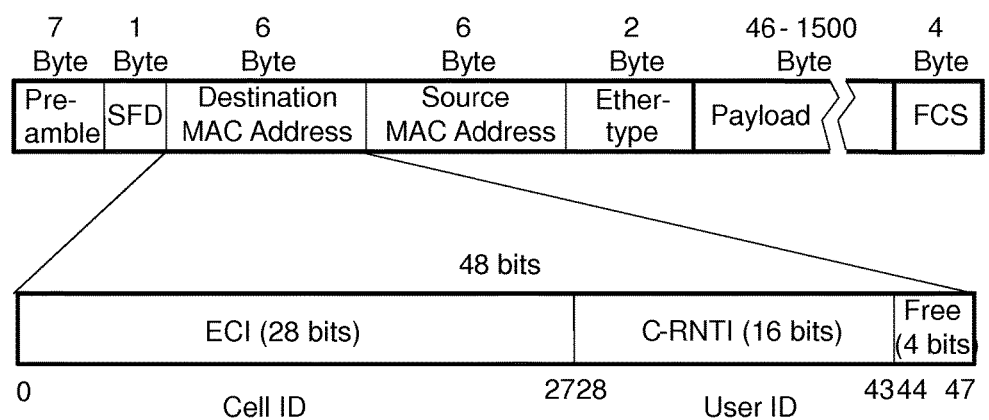
FIG. 2 is a schematic view illustrating addressing by means of a RAN-ID introduced into an Ethernet packet in accordance with an embodiment of the present invention.

FIG. 2 relates to an embodiment where routing is based on Ethernet addresses. Specifically, FIG. 2 is a schematic view illustrating addressing by means of a RAN-ID introduced into an Ethernet packet in accordance with an embodiment of the present invention. As generally known, the Ethernet packet contains a header, including a preamble, a field denoted SFD (Start Frame Delimiter), a destination MAC address, a source MAC address and a field specifying the Ether-type. The header is followed by the packet's payload, and the packet is terminated by a field denoted FCS (Frame Check Sequence).

In the illustrated embodiment the implementation of a RAN-ID is done on layer 2 (i.e. at the MAC layer). This is possible since (under the assumption of SDN, i.e., Open-Flow switches are deployed along packet paths) switches will forward packets simply according to their installed rules and the destination (L2) address of the packet, regardless of the existence of this address as an actual physical interface address. Thus, as shown in FIG. 2, one can, for example, assign an encoded RAN-ID as destination MAC address. For instance, of the 48 bits of an Ethernet address, it is possible to use 28 bits for the cell ID (ECI) and 16 bits for the user ID in the cell (C-RNTI), and have the network route the packets based entirely along scheduler-defined routes. An example for using such logical, constructed MAC-addresses for switching in a data center can be found in Radhika Niranjan Mysore et al: "PortLand: A scalable fault-tolerant layer 2 data center network fabric", in *SIGCOMM Comput. Commun. Rev.* 39, 4 (August 2009), 39-50), which is incorporated herein by way of reference. Alternatively, transport layer addressing, as described above, can also be realized via the application payload, for instance by incorporating the RAN-ID into the packet payload.

In principle, as will be appreciated by those skilled in the art, other solutions, for instance, based on tags (e.g., VLAN tags) or specialized headers, are also feasible. Depending on the standardization state of such headers, extensions to the used SDN protocol might be necessary though, which is not the case for the Ethernet L2 solution described above in connection with FIG. 2.

Figure 3:
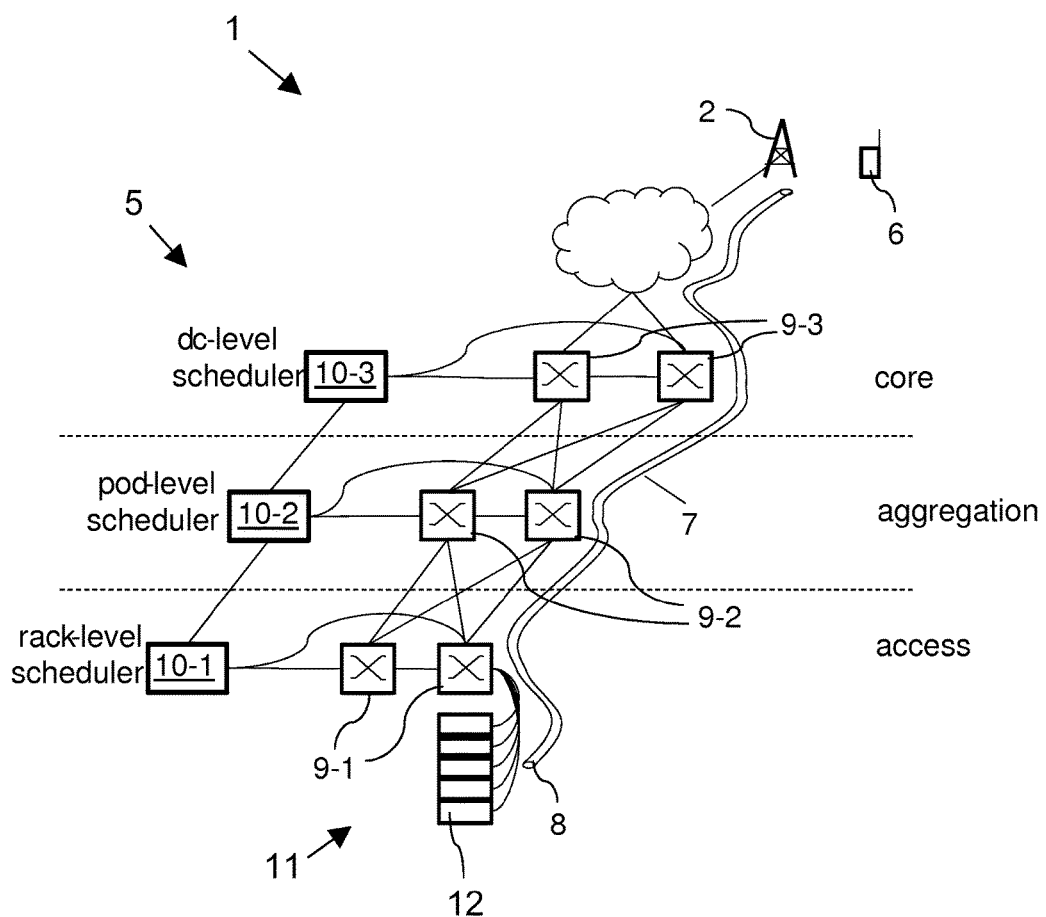
FIG. 3 is a schematic view illustrating a high level architecture of a data center of a C-RAN in accordance with an embodiment of the present invention.

FIG. 3, in which like numerals denote like components as in FIG. 1, schematically illustrates a C-RAN 1 together with a high level architecture of a data center 5 of this C-RAN 1 in accordance with an embodiment of the present invention. Specifically, FIG. 3 depicts exemplarily a remote radio access point 3 with a mobile user terminal 6 connected thereto. The remote radio access point 3 is connected via backhaul link 4 with the data center 5.

Generally, it may be provided that the RAN and the data center 5 are connected via an SDN network controlled and managed by the network operator. However, if this is not the case, the traffic from the RAN could be encapsulated and tunneled via an L2 tunnel 7 to a tunnel endpoint 8 close to the data center 5 or within the data center 5, as shown in FIG. 3. From this tunnel endpoint 8 onwards the scheduling-defined routing mentioned above may be applied.

As shown in FIG. 3, the data center 5 is organized hierarchically, with groups of compute resources being provided on a data center (or core) level, on a pod (or aggregation) level, and on a rack (or access) level. As will be easily appreciated by those skilled in the art, another distribution of the levels may be implemented as well, and also the number of levels may be different from the number of three levels chosen in the embodiment illustrated in FIG. 3.

Each group of compute resources to be used for RAN processing and connected by a switch 9 (i.e., topologically grouped) has a scheduler 10 directly connected to the switch 9. Each scheduler 10 is aware of the resource utilization on its own level. That is, a scheduler 10-1 connected to a ToR (Top of Rack) switch 9-1 has a good picture of the utilization of individual servers, a scheduler 10-2 on pod level knows about utilization of individual racks connected to 'its' pod, and a scheduler 10-3 on data center-level has a rather global view and may thus preferably schedule entire base stations.

Assignment of RAN-App jobs or processing tasks to compute resources happens through adapting the switches' 9 SDN rules on each level (e.g., with OpenFlow rules). A data center-level scheduler 10-3 can select pods for jobs, a pod-level scheduler 10-2 can select racks 11 and finally a rack-level scheduler 10-1 can change forwarding rules to send jobs to specific physical computer hosts 12, e.g. servers. However, the higher-level schedulers 10-3, 10-2 should not schedule on a per-user basis, but rather aggregates of users, e.g., all jobs from a specific base station 2 (or group of base stations) to a specific pod. For instance, this can be done by using wildcard rules/masks on the SDN switches 9 and thus also aggregating routes. The structure of the address may be derived in a way that physically co-located cells and users receive similar addresses which would allow for applying wildcard rules.

Only the lower-level schedulers 10-1 schedule individual users in a fine-grained fashion. In this context it should be noted that, while embodiments of the present invention primarily deal with the instantiation of a resulting scheduling by means of forwarding rules, these solutions are agnostic to the actual scheduling algorithm(s) used. For instance, scheduling algorithms could include as input parameters the server utilization, available instantiated VM (Virtual Machine) types and configurations (if necessary for different RAN-Apps) and co-location, among other possible aspects, as will be easily appreciated by those skilled in the art.

In any case, the scheduling algorithm is configured to try to co-locate physically close or interfering users terminals' processing: Assuming a user A is already scheduled for processing on a given compute resource, and a second user B is to be scheduled that could lead to a processing gain if processed jointly with user A. Then if resources are free in close topological proximity (in particular on the same node, or at least in the same rack) to the compute resource assigned to A, user B can be scheduled there. If not, the scheduler would try to schedule user B in an area of the data center 5 where enough resources are available for both processes.

The hierarchical scheduling and routing as described above has two main advantages: first, rules on the higher layers of the switching fabric should tend to be relatively static and their number low. Second, user terminals 6 that are in the same physical area of the RAN will tend to be scheduled for processing in topologically closer parts of the data center 5. Given good scheduling algorithms, processing gain of tightly coupled users can thus be supported naturally by scheduling these users on low-delay pairs of compute resources, ideally on the same physical host 12.

According to an embodiment of the present invention it may be provided that the servers, i.e. the compute resources, and thus the routes are selected for a user terminal 6 during its attachment to the RAN, when time allows adapting the rules in the switches 9. Therefore, schedulers 10 keep track of different virtual machine configuration and their availability within the data center 5. For instance, assuming a user terminal 6 must be processed by a virtual machine of type A, then the scheduler 10 must identify a server/compute resource which runs the corresponding type of virtual machine in order to schedule the user terminal 6 on this computing server/resource.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of managing Radio Access Network (RAN) processing within a data center of a centralized radio access network (CRAN), wherein the data center comprises a plurality of compute resources that perform at least part of the RAN processing for a plurality of connected remote radio access points, the method comprising:
   receiving, by the data center from the plurality of connected remote radio access points, a plurality of packets, each packet including identification information assigned by a respective one of the connected remote radio access points from which the respective packet is received, wherein each of the plurality of packets is transmitted by one of the plurality of connected remote radio access points following completion of a first portion of the RAN processing corresponding to the respective packet;
   scheduling, on the plurality of compute resources by schedulers of the data center based on a scheduling algorithm, a second portion of the RAN processing corresponding to each of the plurality of packets; and
   routing, by switches within the data center based on the identification information, each respective one of the plurality of packets to a compute resource scheduled to perform the second portion of the RAN processing corresponding to the respective packet.

2. The method according to claim 1, wherein the identification information included in a respective packet is used by the switches within the data center as a locator for the compute resource scheduled to perform the second portion of the RAN processing corresponding to the respective packet.

3. The method according to claim 1, wherein the identification information contains an RAN-ID which is unique for each user and base station ID combination within the RAN.

4. The method according to claim 3, wherein the RAN-ID is composed of a cell ID and a user ID within a cell.

5. The method according to claim 3, wherein the RAN-ID is encoded as a destination address.

6. The method according to claim 1, wherein the scheduling of the second portion of the RAN processing corresponding to each of the plurality of packets and the routing of the plurality of packets is performed jointly.

7. The method according to claim 1, wherein a RAN processing task covers processing of all user terminals that are attached to a particular one of the plurality of connected remote radio access points.

8. The method according to claim 1, wherein the scheduling algorithm aims at co-locating related RAN processing tasks within the data center.

9. The method according to claim 1, wherein the plurality of packets are transported from the plurality of connected remote radio access points to the data center via an interconnecting SDN network or by encapsulating and tunneling the plurality of packets to a tunnel endpoint within the data center or close to the data center.

10. The method according to claim 1, wherein the first portion of the RAN processing corresponding to a respective packet is at least a portion of at least one of physical layer processing corresponding to the respective packet, data link layer processing corresponding to the respective packet, and network layer processing corresponding to the respective packet, and wherein the second portion of the RAN processing corresponding to the respective packet is the portion of the physical layer, data link layer, and network layer processing not included in the first portion of the RAN processing corresponding to the respective packet.

11. A centralized radio access network (CRAN), comprising:

a plurality of remote radio access points, wherein the plurality of remote radio access points are configured to transmit a plurality of packets to a data center, to assign identification information to each of the plurality of packets, and to perform, for each respective packet of the plurality of packets, a first portion of radio access network (RAN) processing corresponding to the respective packet, and the data center, wherein the data center is configured to receive the plurality of packets from the plurality of remote radio access points, and wherein the data center includes:

a plurality of physical compute hosts, a scheduling system including a plurality of schedulers, wherein the plurality of schedulers are configured to schedule, on the plurality of physical compute hosts based on a scheduling algorithm, a second portion of the RAN processing corresponding to each of the plurality of packets, and a plurality of switches configured to route, based on the identification information, each respective packet of the plurality of packets to a compute resource scheduled to perform the second portion of the RAN processing corresponding to the respective packet.

12. The network according to claim 11, wherein the scheduling system within the data center is organized hierarchically.

13. The network according to claim 12, wherein each hierarchy level comprises at least one of the plurality of schedulers.

14. The network according to claim 11, wherein the scheduling system comprises at least a scheduler operating on a data center level, a scheduler operating on a pod level, and a scheduler operating on a rack level.

15. The network according to claim 11, wherein the scheduling algorithm is configured to co-locate related RAN processing tasks within the data center.

16. The network according to claim 11, wherein the plurality of remote radio access points and the data center are connected via an SDN network.

17. The network according to claim 11, wherein the first portion of the RAN processing corresponding to a respective packet is at least a portion of at least one of physical layer processing corresponding to the respective packet, data link layer processing corresponding to the respective packet, and network layer processing corresponding to the respective packet, and wherein the second portion of the RAN processing corresponding to the respective packet is the portion of the physical layer, data link layer, and network layer processing not included in the first portion of the RAN processing corresponding to the respective packet.

* * * * *